(No Model.) 2 Sheets—Sheet 1.

C. W. CRANNELL.
NAILLESS HORSESHOE.

No. 487,177. Patented Nov. 29, 1892.

Witnesses
Jesse Heller
Phil C. Masi

Inventor
C. W. Crannell,
by E. W. Anderson
his Attorney

THE NORRIS PETERS CO., PHOTO-LITHO., WASHINGTON, D. C.

(No Model.) 2 Sheets—Sheet 2.

C. W. CRANNELL.
NAILLESS HORSESHOE.

No. 487,177. Patented Nov. 29, 1892.

Witnesses
Jesse Heller
Phill Masi

Inventor
C. W. Crannell,
by E. W. Anderson
his Attorney

THE NORRIS PETERS CO., PHOTO-LITHO., WASHINGTON, D. C.

UNITED STATES PATENT OFFICE.

CHARLES W. CRANNELL, OF OBERLIN, KANSAS, ASSIGNOR OF ONE-HALF TO D. E. GROBE, OF SAME PLACE.

NAILLESS HORSESHOE.

SPECIFICATION forming part of Letters Patent No. 487,177, dated November 29, 1892.

Application filed April 30, 1892. Serial No. 431,272. (No model.)

*To all whom it may concern:*

Be it known that I, CHARLES W. CRANNELL, a citizen of the United States, and a resident of Oberlin, in the county of Decatur and State of Kansas, have invented certain new and useful Improvements in Nailless Horseshoes; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
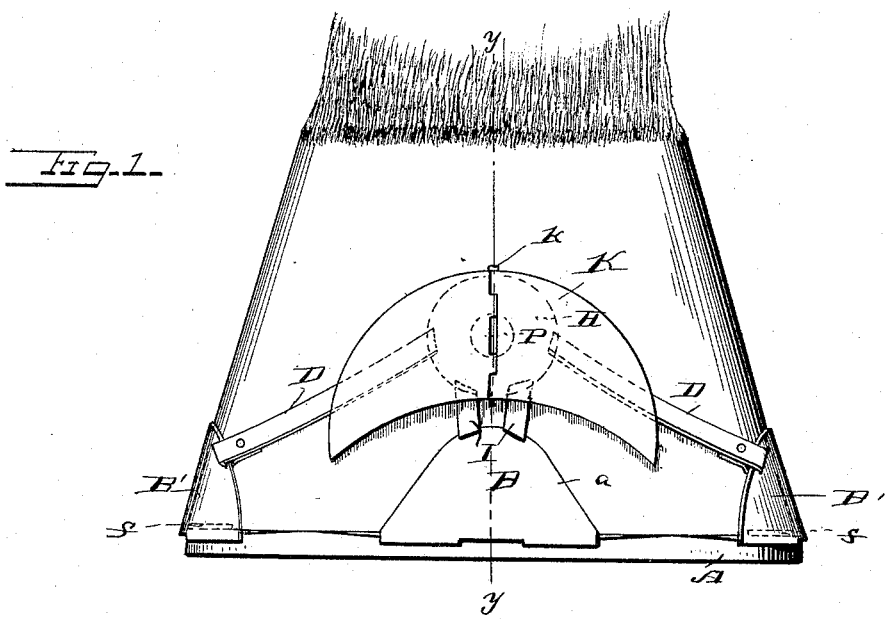
Figure 2:
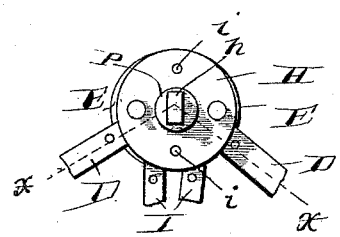
Figure 3:
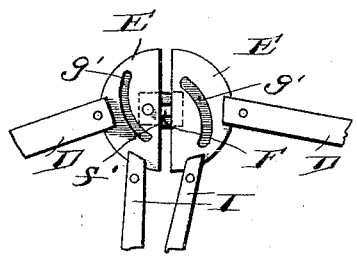
Figure 10:
Figure 12:
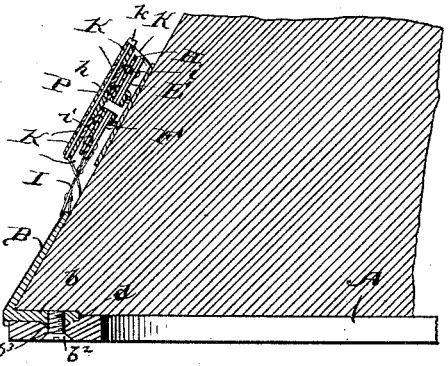
Figure 4:
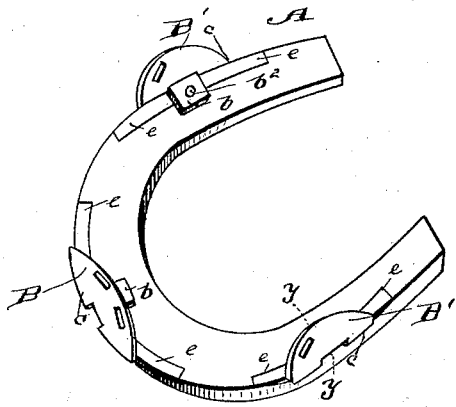
Figure 5:
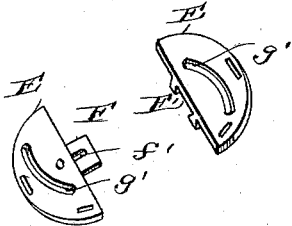
Figure 11:
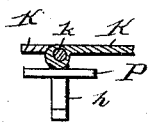
Figure 8:
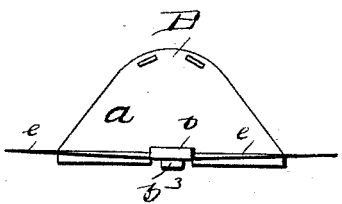
Figure 6:
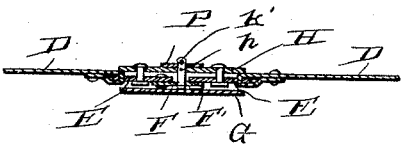
Figure 9:
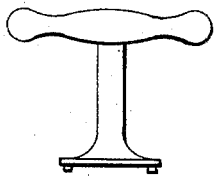
Figure 7:
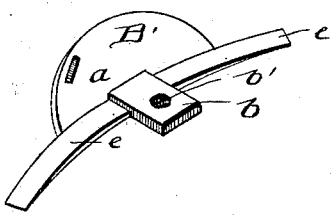

Figure 1 is a front view of a horse's hoof with shoe attached. Fig. 2 is a partial plan showing the strips D D I I and the top plate H. Fig. 3 is a partial plan showing the cam-grooves in the plate E. Fig. 4 is a perspective of the shoe. Fig. 5 is a perspective of the plates E. Fig. 6 is a section of Fig. 2 on the line $x\ x$. Fig. 7 is a perspective of one of the side clips B'. Fig. 8 is a front view of the clip B. Fig. 9 is a view of the wrench. Fig. 10 is a partial section of the shoe, showing the countersunk hole to receive the clip. Fig. 11 is a partial section of top plates K. Fig. 12 is a vertical section on line $y\ y$ of Fig. 1.

This invention has relation to certain new and useful improvements in horseshoes, the object being to provide a shoe which can be held rigidly to the foot without the use of nails or other fastening devices which penetrate and injure or break the hoof, said shoe being so constructed as to guard against any danger of its accidental displacement or detachment, while it is capable of being quickly removed and replaced when desired.

With these objects in view the invention consists in the novel construction and combination of parts, all as hereinafter specified.

In the accompanying drawings, the letter A designates the shoe proper, which may be of plate form, as shown, or calked, said shoe being of the usual shape, with the exception that the nail perforations and grooves are omitted, leaving a plain solid wearing-surface. Said shoe is primarily secured to the hoof, as shown in Fig. 1, by means of clips B B', usually three in number, one being located at the toe portion and one at each side intermediate of the toe and heel. Said clips comprise each a body portion $a$, usually of semi-oval plate form, slightly concaved on the inner face to neatly fit the hoof. At the lower central portion of the plate is an inwardly-turned horizontal flange $b$, formed with a threaded perforation $b'$. The under surface of the flange is usually thickened around said perforation to form an extended boss or bearing $b^3$ for the securing-screw $b^2$. At the points $c\ c\ c$ corresponding, respectively, to the points where the clips are attached, the shoe is formed with vertical perforations $d$, countersunk in from both sides. The thickened portion or boss $b^3$ around the perforation $b'$, when the clip is applied, fits into the countersink in the upper face of the shoe, (said boss being tapered for that purpose,) the metal around said countersink being also cut away, so that the flange $b$ will set nearly flush with the surface. The lower edge of the plate $a$ of the clip is formed to closely fit the peripheral edge of the shoe, so that when the screw $b^2$ is inserted and tightened the clip is rigidly clamped to the shoe, as clearly shown in Fig. 4. Said clips are also formed with integral lateral horizontal flanges $e$, of segmental form, tapering to a thin edge at their extremities, said flanges being let into cut-away portions in the upper marginal face of the shoe, in which they seat flush, forming a bearing for the hoof, and also affording side braces for the clips. When the shoe is applied to the foot, these clips neatly fit against the hoof, the outer lower edge of the hoof being slightly notched or cut, as indicated at $f$ in dotted lines, Fig. 1, to receive the flange $b$, which prevents the shoe any endwise displacement.

For the purpose of drawing the shoe closely to the hoof and rigidly securing it in place I provide the devices now to be described.

D D designate thin metal straps, which at their lower ends are loosely secured in slots or loops formed in the side clips B' B'. These straps extend forwardly and upwardly over the opposite side of the hoof and are connected at their upper ends each to a draw-plate E. These plates E are preferably of semicircular or semi-oval form, with their straight edges contiguous, and are connected to each other by a short metal tongue or plate F, which is rigidly secured to one of said plates and works in a dovetailed groove F' in the under surface of the other, so that said plates are capable of a sliding movement toward each other. The plates E may bear directly against the front portion of the hoof; but I prefer, however, to employ a dished or concaved wear or guard plate G, which fits closely against the hoof and upon which the plates E wear.

On the upper surface of the plates E, I form cam grooves or ways $g'$, as clearly shown in Fig. 3, which are engaged by similar bosses or lugs on the under surface of a circular binding-plate H, which fits over said plates E. This plate H is held in place by means of a bolt $h$, which works in an elongated slot $f'$ in the tongue or connecting-plate F, in which it is held by its headed lower end. To the toe-clip B are connected two short straps I, one on each side, which extend upwardly and laterally, and are connected at their upper ends to the respective plates E. It will therefore be apparent that when the binding-plate H is turned in one direction its cam lugs or bosses engaging the ways or grooves $g'$ will draw the plates E E toward each other, causing a tension on the straps D D, which draws the side portions of the shoe closely to the hoof. At the same time a similar tension will be given the straps I, which will bring the toe portion securely against the hoof. To release the tension and remove the shoe, the binding-plate is turned in the opposite direction. In order to operate this binding-plate, it is formed with two small seats or perforations $i$ at opposite points for the engagement of a span-wrench or key, such as shown in Fig. 9.

In order to cover the draw-plates E E, their connecting-tongue, and the binding-plate H, not only to present a neat appearance, but to prevent injury thereto from an interfering foot, I provide a cap-plate or guard K, of crescent or other neat form, formed in two sections, united by a hinge-joint on the under side. The pin or pintle $k$ of this hinge passes through an eye in the upper end of the bolt $h$, which in this manner serves to hold the cap in place. Said pin or pintle passes eccentrically through the barrel or eye $k'$ of the hinge, which is arranged to bear upon a small piece P, of rubber or other suitable material. The arrangement of the hinge is such that the two sections of the cap may be lifted upwardly and brought together in order that the binding-plate may be operated. When, however, said cap is down in place, the eccentric portion of the barrel or eye bears against the rubber, which is thereby forced down against the parts, binding them in secure position. The convex surface of the guard will ward off a blow from an interfering foot and prevent injury to the fastening devices. Said plate may be of highly polished or plated surface and presents a neat appearance.

The parts are designed to be made, preferably, from thin cast-steel, the fastening-straps and various plates being of slight thickness and occupying but little space.

It will be apparent that the action of the straps D D and I I in drawing the shoe to its place is entirely upward and free from side pressure on the hoof, bringing the shoe squarely against the hoof in such a manner that it cannot become displaced.

When the shoe becomes worn, the clips may be removed by removing the screws $b^2$ and quickly applied to another shoe.

Having described this invention, what I claim, and desire to secure by Letters Patent, is—

1. The herein-described fastening device for horseshoes, comprising the clips having means whereby they are rigidly and removably secured to the shoe, the straps connected at one end to said clips, the draw-plates to which the opposite ends of said straps are connected, the binder-plate having a locking engagement with said draw-plates, means for securing said binder-plate in position, and means for operating said plate, substantially as specified.

2. In a horseshoe, the combination, with the shoe proper having the countersunk perforations in its toe and side portions, of the clips designed to be removably secured to said shoe, said clips comprising each a body portion shaped to fit closely against the outer surface of the hoof, the inward horizontal flange having a screw-seat arranged to fit in the countersink in the upper face of the shoe around the perforation, the lower side portions arranged to fit the peripheral edge of the shoe, the securing-screw, and means connected to said clips for bringing and holding the shoe to its place, substantially as specified.

3. In a horseshoe, the combination, with the shoe proper having the countersunk perforations in its toe and side portions, of the clips designed to be removably and rigidly secured to said shoe, said clips each comprising a plate portion concaved on its inner face to fit the outer surface of the hoof, the inward horizontal flange having a screw-seat arranged to fit the countersink of the perforations in the shoe, said flange seating in a cut-away portion of the upper face of the shoe, the horizontal lateral segmental flanges fitting the upper marginal face of the shoe, and the securing-screw, substantially as specified.

4. In a horseshoe, a clip for holding the shoe to the hoof, said clip comprising a plate portion concaved on its inner face to fit the outer lower surface of the hoof and at its lower portion arranged to fit the peripheral edge of the shoe, the inward horizontal flange designed to engage a notch or shoulder in the outer rim of the hoof, its extended screw-bearing arranged to fit a countersunk perforation in the upper face of the shoe, and the lateral segmental flanges designed to fit the marginal upper face of the shoe, substantially as specified.

5. In a horseshoe, the combination, with the shoe proper having the clips removably secured thereto, one at its toe and one at each intermediate side portion, of the straps, one connected at one end to each of the side clips and two connected to the opposite edge portions of the toe-clip, the draw-plates to which the opposite ends of said straps are connected, the slotted tongue rigidly connected to one of said plates, the binder-plate having a binding engagement with both of said draw-plates, and the bolt for securing said binder-plate in position, substantially as specified.

6. In a horseshoe, the combination, with the shoe proper, the clips removably secured thereto, and the fastening-straps, of the draw-plates to which said straps are connected at one end, the slotted tongue or plate loosely connecting said draw-plates, the camways or grooves in the upper faces of said plates, the binder-plate having lugs or projections engaging said ways or grooves, the bolt held in the slot of said tongue or plate and securing said binder-plate in position, and the cap or guard also held in place by said bolt, substantially as specified.

7. The combination, with the shoe proper, the clips removably secured thereto, the fastening-straps, the draw-plates, the tongue connecting said plates, and the binder-plate, of the bolt working in a slot in said tongue and securing the binder-plate in place, the cap or guard formed in two sections, having a hinge connection, the pintle or pin of said hinge passing through said bolt, and the eccentric eye or barrel of the hinge arranged to bind the parts in place when the guard or cap is down, substantially as specified.

In testimony whereof I affix my signature in presence of two witnesses.

CHARLES W. CRANNELL.

Witnesses:
PHILIP C. MASI,
GEORGE H. PARMELEE.